(12) United States Patent
Rambo et al.

(10) Patent No.: US 7,486,499 B2
(45) Date of Patent: Feb. 3, 2009

(54) ELECTRICAL SWITCHING APPARATUS AND SECURING MECHANISM THEREFOR

(75) Inventors: Barry T. Rambo, Bradley, SC (US); Judith Robin M. Prince, Edgefield, SC (US); Mark W. Jacobsen, Spartanburg, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/772,386

(22) Filed: Jul. 2, 2007

(65) Prior Publication Data

US 2009/0009933 A1    Jan. 8, 2009

(51) Int. Cl.
*H01H 9/20* (2006.01)
*H01H 9/22* (2006.01)

(52) U.S. Cl. .................. 361/609; 361/605; 361/608; 200/50.17; 200/50.21

(58) Field of Classification Search ......... 361/605–609; 200/50.17, 50.21
See application file for complete search history.

(56) References Cited

U.S. PATENT DOCUMENTS

| | | | | |
|---|---|---|---|---|
| 3,288,956 A | * | 11/1966 | Jencks et al. ............. | 200/50.23 |
| 3,440,371 A | * | 4/1969 | Stewart et al. ........... | 200/50.24 |
| 3,474,201 A | * | 10/1969 | Bould ...................... | 200/50.09 |
| 4,002,864 A | | 1/1977 | Kuhn et al. | |
| 4,002,865 A | | 1/1977 | Kuhn et al. | |
| 4,017,698 A | | 4/1977 | Kuhn et al. | |
| 7,019,229 B1 | | 3/2006 | Weister et al. | |

* cited by examiner

*Primary Examiner*—Anatoly Vortman
(74) *Attorney, Agent, or Firm*—Martin J. Moran

(57) ABSTRACT

A securing mechanism is provided for an electrical switching apparatus, such as a circuit breaker, which is movable into and out of an installed position within a switchgear enclosure. The securing mechanism includes a mount coupled to the circuit breaker, and a movable assembly movably coupled to the mount and including an engagement member. The movable assembly moves among first and second positions corresponding to the circuit breaker not being fully installed within the switchgear enclosure and being disposed in the installed position, respectively. When the circuit breaker is moved toward the installed position, the engagement member engages the switchgear enclosure and moves the movable assembly toward the second position, in which the engagement member securely engages the switchgear enclosure to resist undesired movement of the circuit breaker with respect to the switchgear enclosure.

23 Claims, 6 Drawing Sheets

ELECTRICAL SWITCHING APPARATUS AND SECURING MECHANISM THEREFOR

BACKGROUND OF THE INVENTION

1. Field of the Invention

The invention relates generally to electrical switching apparatus and, more particularly, to securing mechanisms for electrical switching apparatus, such as draw-out circuit breakers.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism includes, for example, a combination of rails and rollers coupled to one or the other, or both, of the sidewalls of the cell and the sides of the corresponding circuit breaker, which is to be drawn into and out of the cell. Draw-out circuit breakers are described in further detail, for example, in commonly assigned U.S. Pat. No. 7,019,229, which is hereby incorporated herein by reference.

Under certain circumstances such as, for example, when the circuit breaker trips in response to an electrical fault condition (e.g., without limitation, a current overload; a short circuit; an abnormal voltage or some other fault condition), the circuit breaker may be subjected to relatively large magnetic repulsion forces. Such forces have a tendency to force the circuit breaker out of the cell of the switchgear enclosure. More specifically, the bottom of the circuit breaker is typically relatively secure, for example, by way of its connection to the draw-out mechanism. Accordingly, the magnetic repulsion forces, which are applied to the circuit breaker at some location above the relatively secure bottom, have a tendency to undesirably rotate the circuit breaker within the cell. To resist such rotation, it is desirable that the circuit breaker fits securely within the cell, with as little excess space between the circuit breaker and the cell, as possible.

The dimensions of switchgear enclosure cells can vary, making it necessary to measure the cell and then adjust the draw-out mechanism and/or the circuit breaker accordingly, in order to ensure that the circuit breaker is secure. One way this is known to be accomplished is by employing a plurality of bolts that must be adjusted (e.g., tightened; loosened) until they are brought into contact with a corresponding feature (e.g., without limitation, a bracket; a shelf; a ledge; a protrusion) of the switchgear enclosure in an attempt to resist the undesired movement (e.g., rotation) of the circuit breaker with respect to the cell. Among other disadvantages, measuring the cell and making the necessary adjustments to the circuit breaker and/or the draw-out mechanism is a time-consuming process. It also requires separate tools. This procedure can also be dangerous, for example, if the switchgear is energized at the time the measurements and/or adjustments are made.

There is, therefore, room for improvement in electrical switching apparatus, such as circuit breakers, and in securing mechanisms therefor.

SUMMARY OF THE INVENTION

These needs and others are met by embodiments of the invention, which are directed to a securing mechanism for electrical switching apparatus, such as circuit breakers. The securing mechanism is self-adjusting upon insertion of the circuit breaker into a cell of a switchgear enclosure, in order to secure the circuit breaker within the cell.

As one aspect of the invention, a securing mechanism is provided for an electrical switching apparatus, which is movable into and out of an installed position within a switchgear enclosure. The securing mechanism comprises: a mount structured to be coupled to the electrical switching apparatus; and a movable assembly movably coupled to the mount and including an engagement member. The movable assembly is structured to move among a first position corresponding to the electrical switching apparatus not being fully installed within the switchgear enclosure, and a second position corresponding to the electrical switching apparatus being disposed in the installed position. When the electrical switching apparatus is moved toward the installed position, the engagement member is structured to engage the switchgear enclosure and move the movable assembly toward the second position. When the movable assembly is disposed in the second position, the engagement member is structured to securely engage the switchgear enclosure, in order to resist undesired movement of the electrical switching apparatus with respect to the switchgear enclosure.

The mount may comprise a first portion and a second portion. The first portion may be structured to be coupled to the electrical switching apparatus. The second portion may comprise a first side member, a second side member disposed opposite and spaced apart from the first side member, and a plurality of first fasteners securing the first side member to the second side member. The movable assembly may be disposed between the first side member and the second side member, and may comprise a first side plate, a second side plate disposed opposite and spaced apart from the first side plate, and a plurality of second fasteners securing the first side plate to the second side plate. The engagement member may be disposed between, and be movable with respect to, the first side plate and the second side plate. Each of the first side member and the second side member may have a profile structured to guide movement of the movable assembly. The movable assembly may further comprise at least one biasing element structured to bias the movable assembly toward the second position.

As another aspect of the invention, a draw-out electrical switching apparatus is provided, which is movable into and out of an installed position within a switchgear enclosure. The draw-out electrical switching apparatus comprises: a housing; separable contacts; an operating mechanism structured to open and close the separable contacts; and at least one securing mechanism structured to secure the draw-out electrical switching apparatus in the installed position, the at least one securing mechanism comprising: a mount structured to be coupled to the draw-out electrical switching apparatus, and a movable assembly movably coupled to the mount and including an engagement member. The movable assembly is structured to move among a first position corresponding to the draw-out electrical switching apparatus not being fully installed within the switchgear enclosure, and a second position corresponding to the draw-out electrical switching apparatus being disposed in the installed position. When the draw-out electrical switching apparatus is moved toward the installed position, the engagement member is structured to engage the switchgear enclosure and move the movable assembly toward the second position. When the movable assembly is disposed in the second position, the engagement member is structured to securely engage the switchgear enclosure, in order to resist undesired movement of the draw-out electrical switching apparatus with respect to the switchgear enclosure.

The engagement member of the movable assembly of the securing mechanism may comprise an elongated body including a first end structured to be engageable with the switchgear enclosure, a second end disposed opposite and distal from the first end of the elongated body, a first edge, a second edge disposed opposite the first edge of the elongated body, and at least one slot extending through the elongated body. The movable assembly may further comprise at least one pin member extending between the first side plate and the second side plate, wherein the at least one pin member is disposed within a corresponding one of the at least one slot. The first side plate and the second side plate may be movable in a first direction with respect to the first side member and the second side member, and the elongated body may be movable in both the first direction and in at least one second direction, which is different than the first direction. The elongated body may be movable both with respect to the first side plate and the second side plate, and with respect to the first side member and the second side member.

The switchgear enclosure may comprise a back panel and a plurality of walls arranged to form a cell, wherein the draw-out electrical switching apparatus is structured to be disposed in the installed position within the cell. When the draw-out electrical switching apparatus is disposed in the installed position within the cell, the engagement member of the movable assembly of the securing mechanism may be structured to engage a portion of the back panel and to secure the draw-out electrical switching apparatus with respect to the cell, without requiring a number of tools. The draw-out electrical switching apparatus may be a draw-out circuit breaker, wherein the back panel of the cell includes a protrusion extending outwardly from the back panel. The engagement member may comprise an elongated body including a first end and second end disposed opposite and distal from the first end of the elongated body wherein, when the draw-out circuit breaker is disposed in the installed position within the cell, the first end of the elongated body is structured to be disposed beneath the protrusion, in order to resist the draw-out circuit breaker from undesirably pivoting with respect to the cell.

The housing of the draw-out circuit breaker may include a first side, a second side, and a draw-out mechanism. The draw-out mechanism may comprise a first rail disposed on the first side of the housing, and a second rail disposed on the second side of the housing, wherein the at least one securing mechanism is a first securing mechanism coupled to the first rail, and a second securing mechanism coupled to the second rail.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
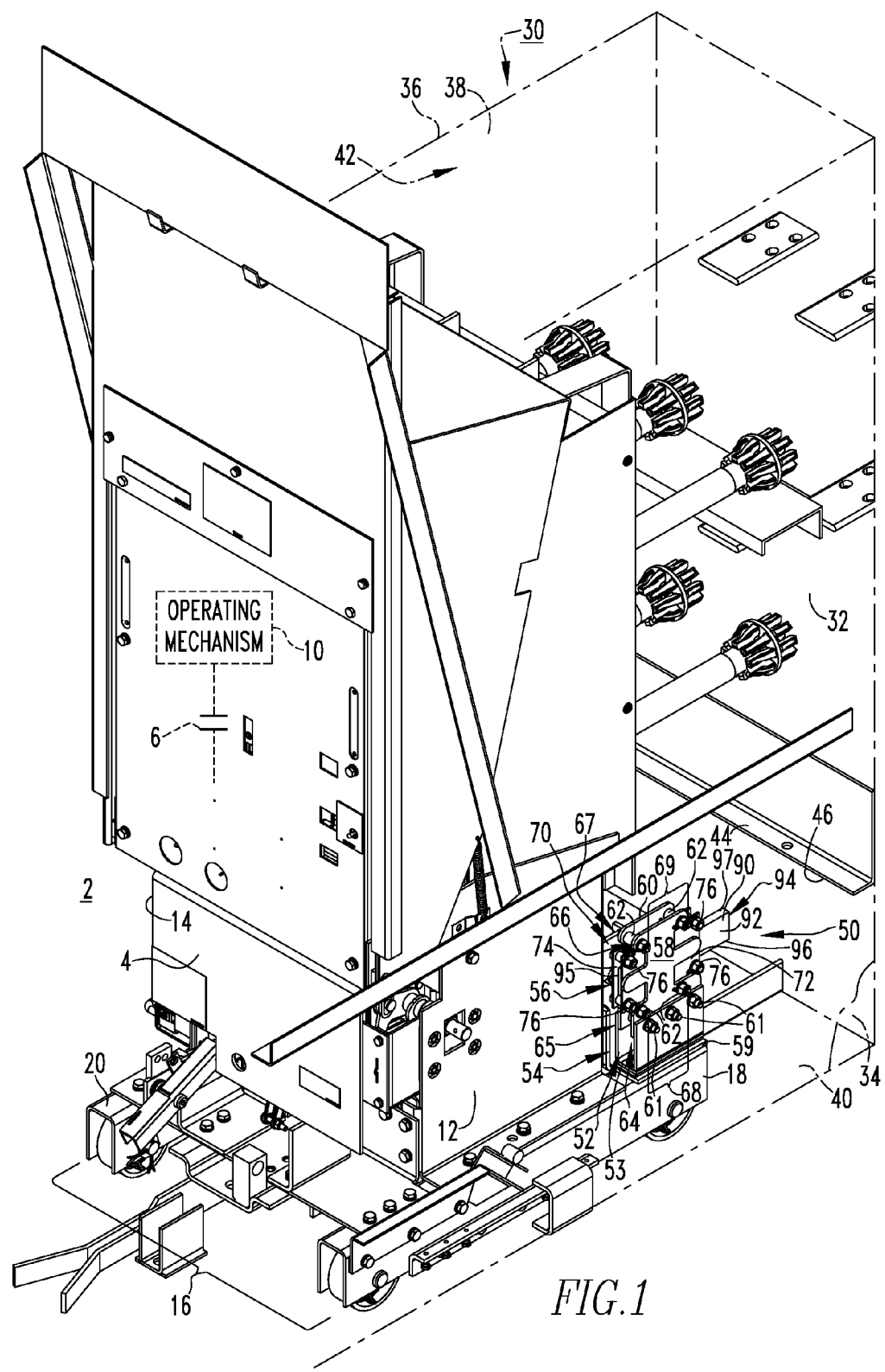
FIG. 1 is an isometric view of a draw-out circuit breaker, shown partially withdrawn from a cell of a switchgear enclosure, and a securing mechanism therefor, in accordance with an embodiment of the invention.

For purposes of illustration, embodiments of the invention will be described as applied to medium-voltage circuit breakers, although it will become apparent that they could also be applied to a wide variety of electrical switching apparatus (e.g., without limitation, circuit switching devices and other circuit interrupters, such as contactors, motor starters, motor controllers and other load controllers) other than medium-voltage circuit breakers and other than medium-voltage electrical switching apparatus.

Directional phrases used herein, such as, for example, left, right, clockwise, counterclockwise and derivatives thereof, relate to the orientation of the elements shown in the drawings and are not limiting upon the claims unless expressly recited therein.

As employed herein, the term "self-adjusting" refers to the ability of the disclosed securing mechanism to move (e.g., without limitation, slide; lift) itself and/or the electrical switching apparatus with respect to the cell of the switchgear enclosure in which the electrical switching apparatus is being inserted, as the electrical switching apparatus is being inserted, in order for the electrical switching apparatus to fit securely within the cell (e.g., without limitation, to resist undesired rotation of the electrical switching apparatus with respect to the cell). In other words, the disclosed securing mechanism automatically moves itself and/or the electrical switching apparatus into a secure relationship within the cell, without requiring any separate tools (e.g., without limitation, wrenches; screwdrivers; rulers; tape measures) or separate operations (e.g., measurement of the cell; adjustment of the draw-out mechanism and/or the circuit breaker to fit securely within the cell).

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the term "number" shall mean one or an integer greater than one (i.e., a plurality).

FIG. 1 shows a securing mechanism 50 for an electrical switching apparatus such as, for example, a medium-voltage draw-out circuit breaker 2, which is movable into and out of an installed position (FIG. 2) within a switchgear enclosure 30 (partially shown). The switchgear enclosure 30 includes a back panel 32 and a plurality of walls 34,36,38,40 arranged to form a cell 42. Each cell 42 (one is shown) of the switchgear enclosure 30 receives a corresponding circuit breaker 2. The back panel 32 of the cell 42 includes a protrusion such as, for example and without limitation, the ledge 44 shown in FIGS. 1 and 2, which is engaged by the securing mechanism 50 (see also securing mechanism 50' of FIG. 6) when the circuit breaker 2 is disposed in the installed position (FIG. 2) within the cell 42. In the example of FIG. 1, the draw-out circuit breaker 2 is shown partially inserted within the cell 42 prior to being inserted into the installed position of FIG. 2. It will be appreciated that the switchgear enclosure 30 may include any suitable number and configuration of cells (e.g., 42), for example, for receiving a corresponding number and configuration of circuit breakers (e.g., 2) or other suitable electrical switching apparatus (not shown).

Figure 6:
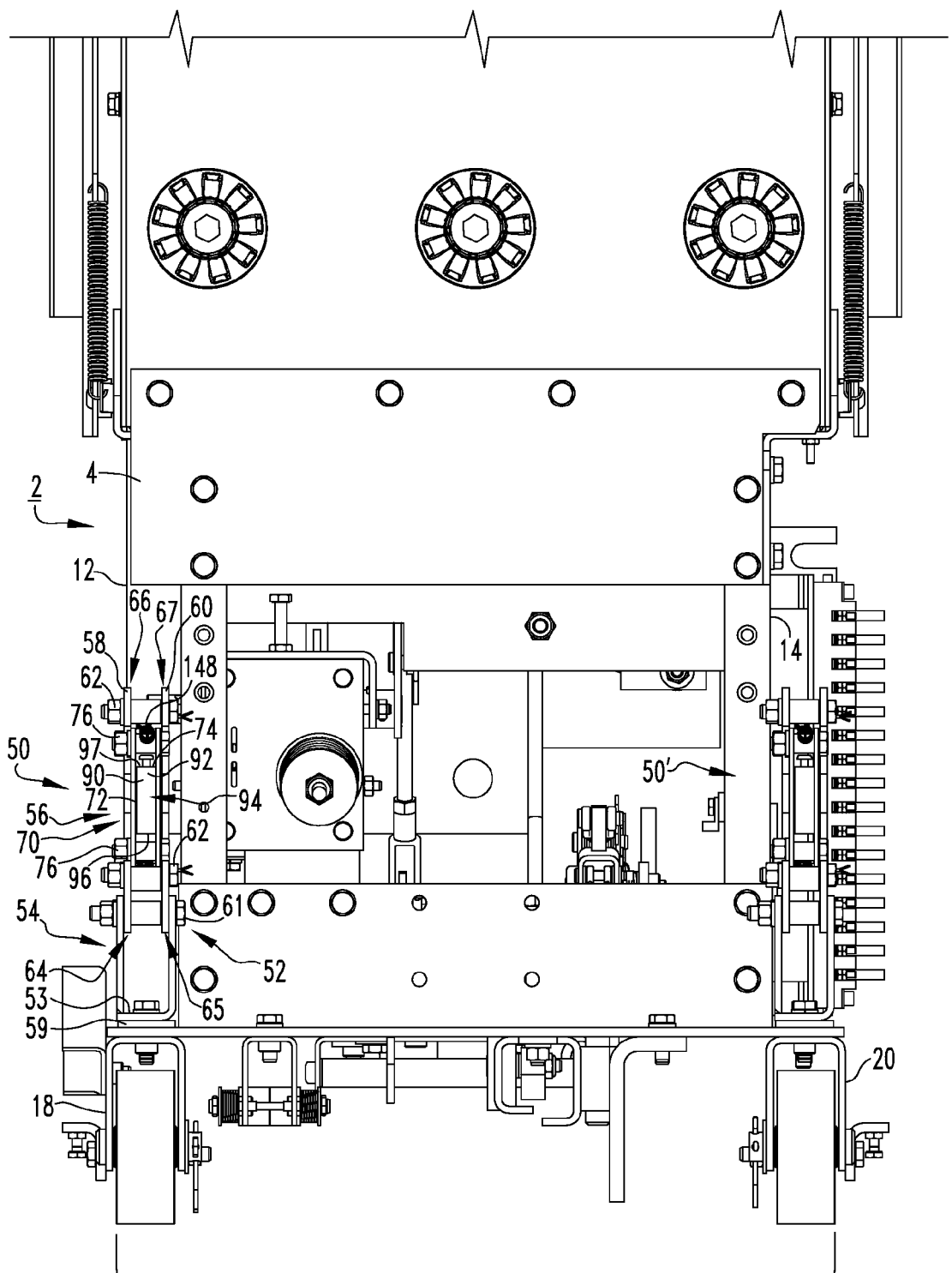
FIG. 6 is a back elevation view of a portion of the draw-out circuit breaker of FIG. 1, showing two securing mechanisms therefor, in accordance with an embodiment of the invention.

The example circuit breaker 2 includes a housing 4, separable contacts 6 (shown in simplified form in hidden line drawing in FIG. 1), and an operating mechanism 10 (shown in simplified form in hidden line drawing in FIG. 1) structured to open and close the separable contacts 6. As shown in FIGS. 1 and 6, the circuit breaker housing 4 includes first and second sides 12,14 and a draw-out mechanism 16. The draw-out mechanism 16 of the example draw-out circuit breaker 2 includes a first rail 18 disposed on the first side 12 of the circuit breaker housing 4, and a second rail 20 (partially shown in FIG. 1) disposed on the second side 14 of the circuit breaker housing 4. It will be appreciated that the circuit breaker 2 may have only one securing mechanism 50 coupled to a corresponding one of the first and second rails 18,20 (see, for example, securing mechanism 50 coupled to first rail 18 in the example of FIG. 1), as shown in FIG. 1, or two securing mechanisms 50,50' coupled to the first and second rails 18,20, respectively, of the draw-out mechanism 16, as shown in the example of FIG. 6. For economy of disclosure, only one of the securing mechanisms 50 will be described, in detail, herein. It will, however, be appreciated that the other securing mechanism 50' (FIG. 6) is substantially identical and functions in substantially the same manner as securing mechanism 50.

Figure 2:
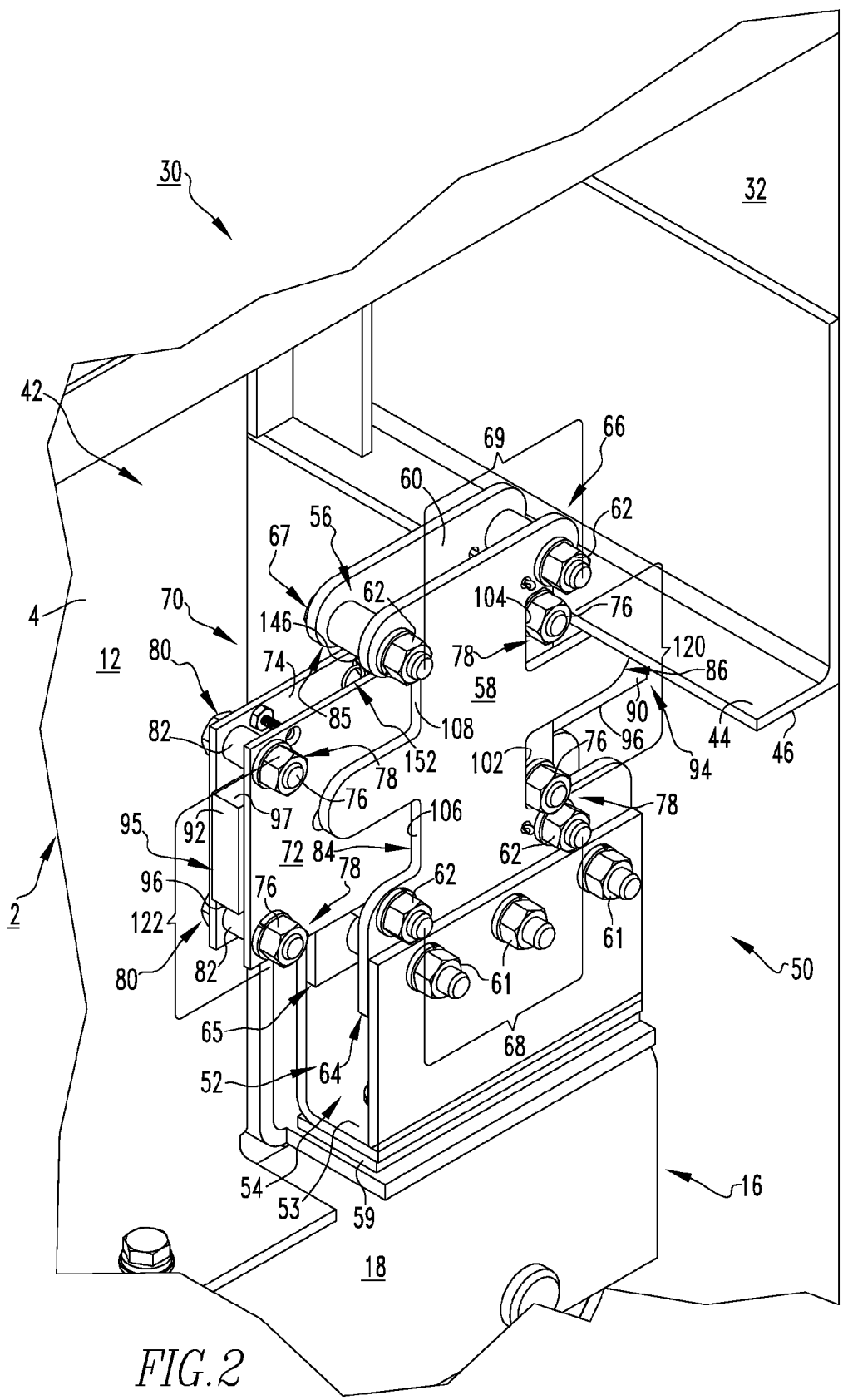
FIG. 2 is an isometric view of a portion of the draw-out circuit breaker and securing mechanism therefor of FIG. 1, modified to show the securing mechanism engaging a portion of the switchgear enclosure cell.
Figure 3:
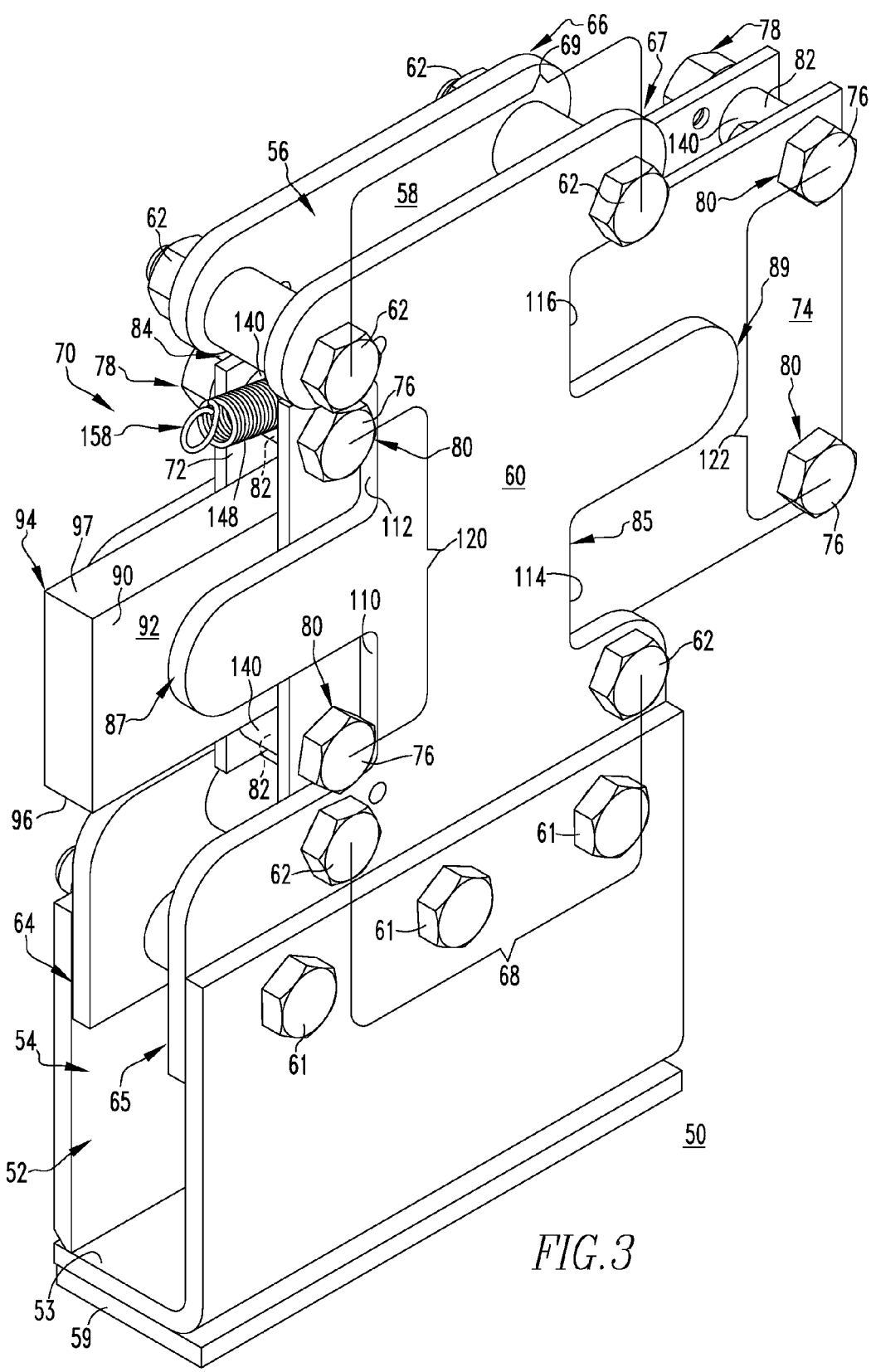
FIG. 3 is an isometric view of the securing mechanism of FIG. 1.
Figure 4:
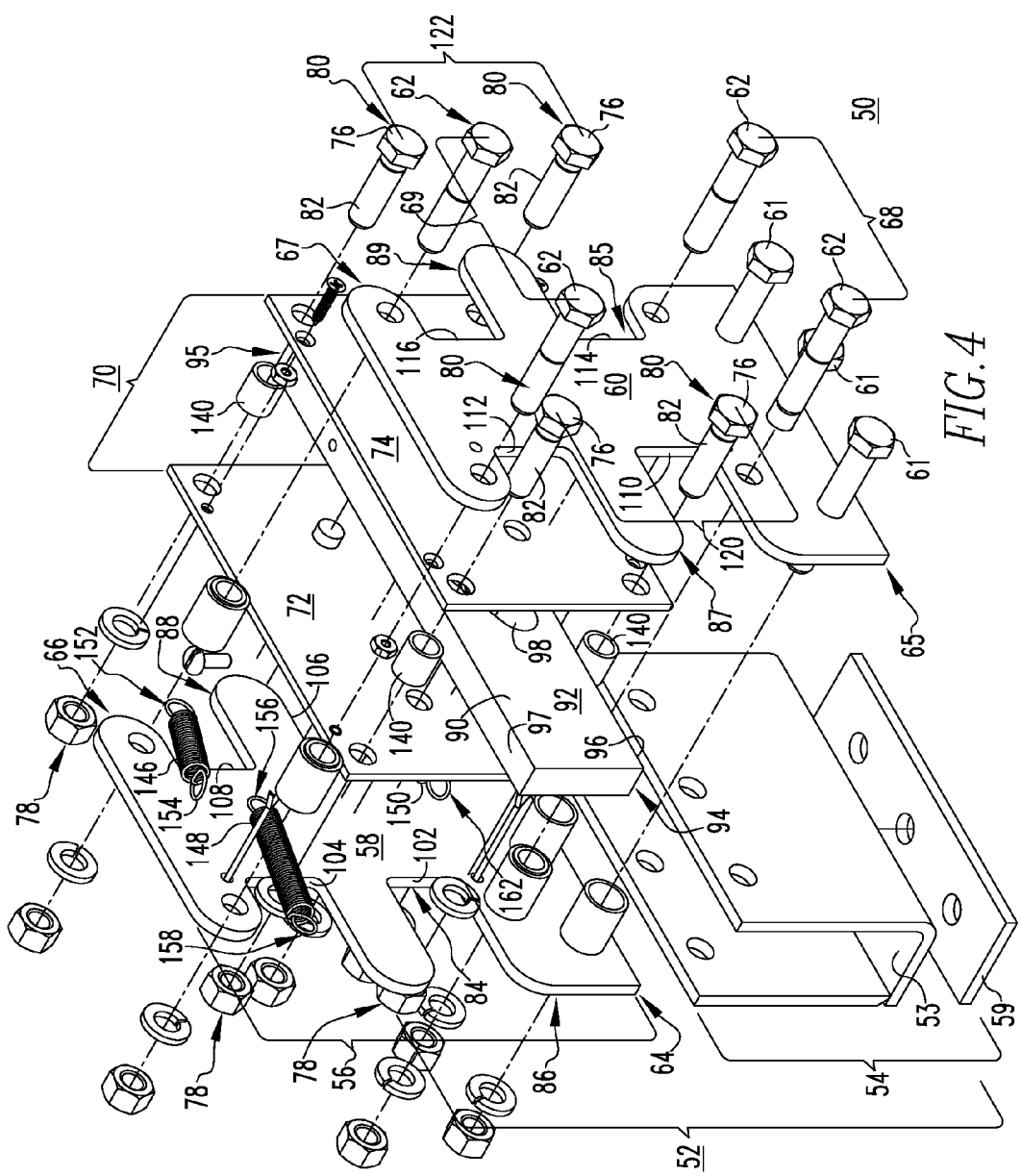
FIG. 4 is an exploded isometric view of the securing mechanism of FIG. 1.

Continuing to refer to FIG. 1, and also to FIGS. 2, 3 and 4, the securing mechanism 50 includes a mount 52 having a first portion 54 and a second portion 56. The first portion 54 of the example mount 52 is a generally U-shaped bracket 54 coupled to the top of the first rail 18 of the draw-out mechanism 16, at or about the end of the rail 18, as shown in FIGS. 1 and 2. A mounting plate 59 may optionally be included between the base 53 of the generally U-shaped bracket 54 and the top of the rail 18. The second portion 56 includes a first side member 58, a second side member 60 disposed opposite and spaced apart from the first side member 58, and a plurality of fasteners 62 securing the first and second side members 58,60 together. A movable assembly 70 is disposed between the first and second side members 58,60, and includes an engagement member 90. Both the movable assembly 70 and the engagement member 90 thereof, are movably coupled to the mount 52 and, in particular, to the second portion 56 of the mount 52, as will now be described.

The first ends 64 and 65 of the first and second side members 58 and 60, respectively, are coupled to the generally U-shaped bracket 54 using any known or suitable fastener or fastening mechanism such as, for example and without limitation, the three bolts 61, which are shown. The second ends 66 and 67 of the first and second side members 58 and 60, respectively, are disposed opposite and distal from the first ends 64 and 65. A first number 68 of the first fasteners 62 extend through the first ends 64,65 of the first and second side members 58,60, respectively, and a second number 69 of first fasteners 62 extend through the second ends 66,67 of the first and second side members 58,60, respectively. The movable assembly 70 is disposed between the first number 68 of first fasteners 62, and the second number 69 of first fasteners 62, as shown. Thus, the first fasteners 62 and, in particular, the portions (e.g., shafts) of the fasteners 62 which are disposed between the first and second side members 58,60, function to restrain movement of a portion of the movable assembly 70 in the vertical direction. The example mount 52 includes two pairs 68,69 of such first fasteners 62, for a total of four first fasteners 62, although it will be appreciated that mount embodiments (not shown) having any known or suitable alternative number and/or configuration of first fasteners 62 or other suitable fastening mechanisms (not shown), could be employed without departing from the scope of the invention.

The movable assembly 70 of the example securing mechanism 50 includes a first side plate 72, a second side plate 74 disposed opposite and spaced apart from the first side plate 72, and a plurality of second fasteners 76 securing the first side plate 72 to the second side plate 74. The aforementioned engagement member 90 is disposed between, and is movable with respect to, the first and second side plates 72,74, as will be discussed hereinbelow. The first side plate 72 is parallel to the first side member 58 of the mount 52, and is movable with respect thereto. The second side plate 74 is parallel to the second side member 60 of the mount 52, and is movable with respect thereto. The second fasteners 76, which fasten the first and second side plates 72,74 of the movable assembly 70 together, include first ends 78, second ends 80, and shafts 82 extending therebetween. Each of the second fasteners 76 extends through the first side plate 72 and the second side plate 74, with the first end 78 being disposed at or about a corresponding one 72 of the first side plate 72 and the second side plate 74, and the second end 80 being disposed at or about the other corresponding one 74 of the first and second side plates 72,74. The shafts 82 of the second fasteners 76 extend between the first and second side plates 72,74. It will be appreciated that although the second fasteners 76 are shown and described herein as comprising bolts 76 having first ends 78 (e.g., without limitation, nuts) disposed at or about the first side plate 72, and second ends 80 (e.g., without limitation, bolt heads) disposed at or about the second side plate 74, that the bolts 76 could be reversed, for example, with the bolt heads 80 being disposed at or about the first side plate 72 and the nuts 78 being disposed at or about the second side plate 74. It will also be appreciated that the bolts 76 or, for that matter, any other known or suitable fastener or fastening mechanism (not shown), could be disposed in any known or suitable alternative number and/or configuration (not shown), in order to achieve the desired movement of the movable assembly 70 with respect to the mount 52, in accordance with the invention.

Specifically, the movable assembly 70 is structured to move among a first position (FIG. 1), corresponding to the draw-out circuit breaker 2 not being fully installed within the cell 42 of the switch gear enclosure 30, and a second position (see, for example, FIG. 2), corresponding to the circuit breaker 2 being disposed in the installed position. When the circuit breaker 2 is moved toward the installed position of FIG. 2, the engagement member 90 of the movable assembly 70 of the securing mechanism 50 is structured to engage the switchgear enclosure 30 and, in particular, the aforementioned ledge 44 on the back panel 32 of the switchgear enclosure 30, in order to move the movable assembly 70 toward the second position. When the movable assembly 70 is disposed in the second position (FIG. 2), the engagement member 90 securely engages the ledge 44 in order to resist undesired movement (e.g., without limitation, pivoting) of the circuit breaker 2 with respect to the switchgear enclosure 30. Specifically, the movable assembly 70 and engagement member 90 thereof have multiple degrees of freedom of movement, in order to translate (e.g., slide) and/or lift, as necessary, for the engagement member 90 to securely engage the ledge 44 of the switchgear enclosure 30, in order that the securing mechanism 50 functions to self-adjust to secure the circuit breaker 2 within the corresponding cell 42 of the switchgear enclosure 30. The circuit breaker 2 is, therefore, prevented from undesirably pivoting with respect to cell 42. It will, therefore, be appreciated that in the example shown and described herein, the linear travel of the circuit breaker 2, as it is being inserted into the installed position, causes the movable assembly 70 to move, as desired.

Figure 5:
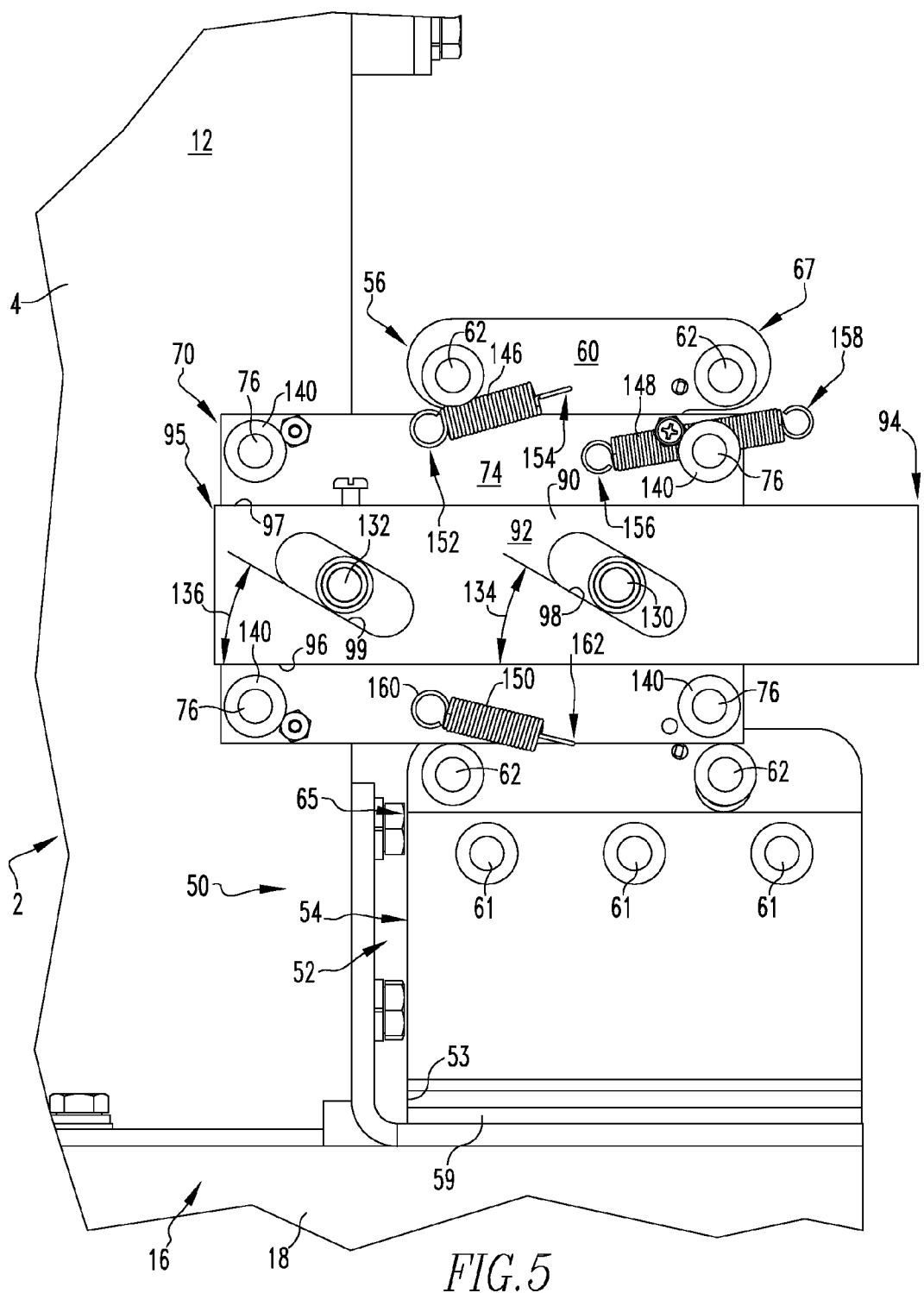
FIG. 5 is a side elevation view of the portion of the draw-out circuit breaker and the securing mechanism therefor of FIG. 1, with a portion of the securing mechanism removed to show internal structures.

The features of the example securing mechanism 50, which provide such movement, will be further appreciated with reference to the exploded view of FIG. 4, and the partial side elevation view of FIG. 5, respectively. Specifically, as shown in FIG. 4, each of the first and second side members 58,60 has a profile 84,85, which is structured to guide movement of the movable assembly 70. In particular, the first ends 78 of the second fasteners 76 are movable with respect to a corresponding one of the profile 84 of the first side member 58 and the profile 85 of the second side member 60. The second ends 80 of the second fasteners 76 are movable with respect to the other one of the profiles 84,85. More specifically, the first side member 58 includes opposing first and second edges 86,88, and the second side member 60 includes first and second opposing edges 87,89. The profile 84 of the first side member 58 includes a number of first cut-out portions 102,104 in the first edge 86, and the number of second cut-out portions 106,108 in the second edge 88. Likewise, the profile 85 of the second side member 60 includes a number of first cut-out portions 110,112 in the first edge 87, and a number of second cut-out portions 114,116 in the second edge 89. In the example shown and described herein, the first ends 78 of a first number 120 (FIGS. 2-4) of the second fasteners 76 are movably disposed within the first cut-out portions 102,104 of the first side member 58, and the second ends 80 of the first number 120 (FIGS. 2-4) of second fasteners 76 are movably disposed within the first cut-out portions 110,112 of the second side member 60. Similarly, the first ends 78 of a second number 122 (FIGS. 2-4) of the second fasteners 76 are movably disposed within the second cut-out portions 106,108 of the first side member 58, and the second ends 80 of the second number 122 (FIGS. 2-4) of second fasteners 76 are movably disposed within the second cut-out portions 114,116 of the second side member 60. In other words, the example movable assembly 70 includes four second fasteners 76, each of which cooperate respectively with a corresponding pair of cut-portions 102,104,106,108,110,112,114,116. It will, however, be appreciated that any known or suitable alternative number and/or configuration of cut-out portions (not shown) and corresponding fasteners could be employed, without departing from the scope of the invention.

As best shown in FIG. 5, the engagement member 90 of the example movable assembly 70 has an elongated body 92 including a first end 94, which is structured to be engageable with the switchgear enclosure 30, as shown in FIG. 2 and as previously discussed, a second end 95 disposed opposite and distal from the first end 94, first and second opposing edges 96,97, and at least one aperture 98,99 (two are shown) extending through the elongated body 92. The elongated body 92 of the example engagement member 90 includes a first slot 98 disposed proximate the middle of the elongated body 92, between the first and second ends 94,95, and a second slot 99 spaced apart from, and generally parallel with respect to, the first slot 98. The second slot 99 is disposed proximate the second end 95 of the elongated body 92 in the example of FIG. 5. Each of the example first and second slots 98,99 extend from proximate the first edge 96 of the elongated body toward the second edge 97, and toward the second end 95 of the elongated body 92, in order to form an acute angle 134, 136 with respect to the first edge 96 of the elongated body 92, as shown. A first pin member 130 extends through the first slot 98, and a second pin member 132 extends through the second slot 99. This slot arrangement enables the elongated body 92 to move upwardly with respect to the mount 52, when the first end 94 of the engagement member 90 engages the back panel 32 of the switchgear enclosure 30, and moves the movable assembly 70 toward the second position, shown in FIG. 2. More specifically, the first and second side plates 72,74 of the movable assembly 70, are movable in a first direction (e.g., to the right and left with respect to FIG. 5), with respect to the first and second side members 56,60 of the mount 52, as previously discussed. The elongated body 92 is movable in both the first direction (e.g., to the left and right with respect to FIG. 5) and in at least one second direction (e.g., upwards and downwards with respect to FIG. 5), which is different than the first direction. The elongated body 92 of the engagement member 90 is, therefore, movable both with respect to the first and second side plates 72,74 of the movable assembly 70, and with respect to the first and second side members 58,60 of the mount 52. In this manner, the top edge 97 of the elongated body 92 may be brought into engagement with the underside 46 of the ledge 44 of the switchgear enclosure 30, as shown in FIG. 2, in order to further secure the circuit breaker 2 within the switchgear enclosure cell 42.

Also shown in FIG. 5 is the fact that the example securing mechanism 50 includes at least one biasing element such as, for example and without limitation, the three tension springs 146,148,150, which are shown. The springs 146,148,150 are structured to bias the movable assembly 70 toward the second position (e.g., toward the back panel 32 of the switchgear enclosure 30, as shown in FIG. 2), in order that, when the draw-out circuit breaker 2 (FIGS. 1, 2 and 6) is disposed in the installed position (FIG. 2), the springs 146,148,150 bias the engagement member 90 toward engagement with the back panel 32 of the switchgear enclosure 30, in order that the engagement member 90 maintains engagement therewith, as shown in FIG. 2. In the example of FIG. 5, each of the three tension springs 146,148 and 150 has first and second ends 152,154, 156,158 and 160,162, respectively. The first ends 152,156,160 are coupled to a corresponding one of the side plates 72,74 (only second side plate 74 is shown in FIG. 5, because first side plate 72 has been removed to show internal structures of the securing mechanism 50). The second ends 154,158,162 are coupled to a corresponding one of a portion of the mount 52 or a portion of the circuit breaker housing 4 (not expressly shown). In this manner, when the first end 94 of the engagement member 90 engages the back panel 32 of the switchgear enclosure 30 (FIGS. 1 and 2), and the movable assembly 70 is moved toward its second position (see, for example, FIG. 2) by way of the circuit breaker 2 (FIGS. 1, 2 and 6) being moved toward its installed position (FIG. 2), tension in the tension springs 146,148,150 increases, thereby biasing the movable assembly 70 and, in particular, the engagement member 90 thereof, toward engagement with the back panel 32 (FIGS. 1 and 2). It will, however, be appreciated that any known or suitable alternative number and/or configuration of biasing elements (not shown) other than the exemplary three tension springs 146,148,150 could be employed without departing from the scope of the invention. It will also be appreciated that the securing mechanism 50 may include a plurality of spacers 140, for example, for the second fasteners 76 of the movable assembly 70. For example, as shown in FIG. 4, the shaft 82 of each of the second fasteners 76 extends through a corresponding spacer 140, which is disposed between the first and second side plates 72,74 of the movable assembly 70. In this manner, the desired spacing between the side plates 72,74 may be maintained, in order to ensure proper movement of the engagement member 90, which is disposed therebetween.

Accordingly, the disclosed securing mechanism 50,50' provides a mechanism for quickly and easily securing an electrical switching apparatus (e.g., without limitation, draw-out circuit beaker 2) within a corresponding cell 42 of a switchgear enclosure 30, without requiring a number of tools or a number of separate operations (e.g., without limitation, measurement of the cell; adjustment of the draw-out mechanism). Rather, the disclosed securing mechanism 50 includes a movable assembly 70, which enables the securing mechanism 50 and/or electrical switching apparatus 2 to self-adjust, in order to engage (e.g., without limitation, ledge 44) a feature of the switchgear enclosure 30 and thereby resist undesired movement (e.g., pivoting) of the electrical switching apparatus 2, with respect to the switchgear enclosure 30. For example, the engagement member 90 of the example securing mechanism 50 moves backward and upward (with respect to FIGS. 1-6), until the top edge 97 of the engagement member 90 engages the underside 46 of a ledge 44 of the switchgear enclosure 30, as the draw-out circuit breaker 2 is moved into the installed position (FIG. 2) within the corresponding cell 42 of the switchgear enclosure 30.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A securing mechanism for an electrical switching apparatus which is movable into and out of an installed position within a switchgear enclosure, said securing mechanism comprising:
    a mount structured to be coupled to said electrical switching apparatus; and
    a movable assembly movably coupled to said mount and including an engagement member, said movable assembly being structured to move among a first position corresponding to said electrical switching apparatus not being fully installed within said switchgear enclosure, and a second position corresponding to said electrical switching apparatus being disposed in said installed position,
    wherein, when said electrical switching apparatus is moved toward said installed position, said engagement member is structured to engage said switchgear enclosure and move said movable assembly toward said second position,
    wherein, when said movable assembly is disposed in said second position, said engagement member is structured to securely engage said switchgear enclosure, in order to resist undesired movement of said electrical switching apparatus with respect to said switchgear enclosure, and
    wherein, upon movement of said electrical switching apparatus to said installed position, said engagement member is structured to securely engage said switchgear enclosure automatically, without said engagement member or said movable assembly being manipulated by an actuator.

2. A securing mechanism for an electrical switching apparatus which is movable into and out of an installed position within a switchgear enclosure, said securing mechanism comprising:
    a mount structured to be coupled to said electrical switching apparatus; and
    a movable assembly movably coupled to said mount and including an engagement member, said movable assembly being structured to move among a first position corresponding to said electrical switching apparatus not being fully installed within said switchgear enclosure and a second position corresponding to said electrical switching apparatus being disposed in said installed position,
    wherein, when said electrical switching apparatus is moved toward said installed position, said engagement member is structured to engage said switchgear enclosure and move said movable assembly toward said second position,
    wherein, when said movable assembly is disposed in said second position, said engagement member is structured to securely engage said switchgear enclosure, in order to resist undesired movement of said electrical switching apparatus with respect to said switchgear enclosure, and
    wherein said mount comprises a first portion and a second portion; wherein said first portion is structured to be coupled to said electrical switching apparatus; wherein said second portion comprises a first side member, a second side member disposed opposite and spaced apart from said first side member, and a plurality of first fasteners securing said first side member to said second side member; and wherein said movable assembly is disposed between said first side member and said second side member.

3. The securing mechanism of claim 2 wherein said first portion is a generally U-shaped bracket; wherein each of said first side member of said second portion and said second side member of said second portion has a first end coupled to said generally U-shaped bracket, and a second end disposed opposite the first end; wherein a first number of said first fasteners is disposed at said first end; wherein a second number of said first fasteners is disposed at said second end; and wherein said movable assembly is disposed between said first number of said first fasteners and said second number of said first fasteners.

4. The securing mechanism of claim 2 wherein said movable assembly comprises a first side plate, a second side plate disposed opposite and spaced apart from said first side plate, and a plurality of second fasteners securing said first side plate to said second side plate; wherein said engagement member is disposed between, and is movable with respect to, said first side plate and said second side plate; wherein said first side plate is parallel to said first side member and is movable with respect thereto; and wherein said second side plate is parallel to said second side member and is movable with respect thereto.

5. The securing mechanism of claim 4 wherein said second fasteners include first ends, second ends, and shafts extending between the first ends and the second ends; wherein said second fasteners extend through said first side plate and said second side plate; wherein the first ends of said second fasteners are disposed at or about a corresponding one of said first side plate and said second side plate; wherein the second ends of said second fasteners are disposed at the other corresponding one of said first side plate and said second side plate; and wherein said shafts of said second fasteners extend between said first side plate and said second side plate.

6. The securing mechanism of claim 5 wherein each of said first side member and said second side member has a profile structured to guide movement of said movable assembly; wherein the first ends of said second fasteners are movable with respect to a corresponding one of said profile of said first side member and said profile of said second side member; and wherein the second ends of said second fasteners are movable with respect to the other corresponding one of said profile of said first side member and said profile of said second side member.

7. The securing mechanism of claim 6 wherein each of said first side member and said second side member includes a first edge and a second edge disposed opposite the first edge; wherein each of said profile of said first side member and said profile of said second side member includes a number of first cut-out portions in the first edge, and a number of second cut-out portions in the second edge; wherein the first ends of a first number of said second fasteners are movably disposed within said number of first cut-out portions of said first side member, and the second ends of said first number of said second fasteners are movably disposed within said number of first cut-out portions of said second side member; and wherein the first ends of a second number of said second fasteners are movably disposed within said number of second cut-out portions of said first side member, and the second ends of said second number of said second fasteners are movably disposed with said number of second cut-out portions of said second side member.

8. The securing mechanism of claim 7 wherein said plurality of second fasteners is four second fasteners; wherein said number of first cut-out portions is two first cut-out portions; wherein said number of second cut-out portions is two second cut-out portions; wherein said two second cut-out portions are disposed opposite said two first cut-out portions; and wherein an end of each of said four second fasteners is movably disposed in a corresponding one of said two first cut-out portions and said two second cut-out portions.

9. The securing mechanism of claim 5 wherein said engagement member comprises an elongated body including a first end structured to be engageable with said switchgear enclosure, a second end disposed opposite and distal from the first end of said elongated body, a first edge, a second edge disposed opposite the first edge of said elongated body, and at least one aperture extending through said elongated body; wherein said movable assembly further comprises at least one pin member extending between said first side plate and said second side plate; and wherein said at least one pin member is disposed within a corresponding one of said at least one aperture of said elongated body.

10. The securing mechanism of claim 9 wherein said at least one aperture is a first slot disposed between the first end of said elongated body and the second end of said elongated body, and a second slot spaced apart from, and generally parallel with respect to, said first slot; wherein each of said first slot and said second slot extend from proximate the first edge of said elongated body toward the second edge of said elongated body and toward the second end of said elongated body, in order to form an acute angle with respect to the first edge of said elongated body; wherein said at least one pin member is a first pin member extending through said first slot and a second pin member extending through said second slot; and wherein, when the first end of said elongated body engages said switchgear enclosure, said elongated body moves upwardly with respect to said mount.

11. The securing mechanism of claim 5 wherein said movable assembly further comprises a plurality of spacers; wherein said spacers are disposed between said first side plate and said second side plate; and wherein the shafts of at least some of said second fasteners extend through said first side plate, through a corresponding one of said spacers, and through said second side plate.

12. A securing mechanism for an electrical switching apparatus which is movable into and out of an installed position within a switchgear enclosure, said securing mechanism comprising:
a mount structured to be coupled to said electrical switching apparatus; and
a movable assembly movably coupled to said mount and including an engagement member, said movable assembly being structured to move among a first position corresponding to said electrical switching apparatus not being fully installed within said switchgear enclosure and a second position corresponding to said electrical switching apparatus being disposed in said installed position,
wherein, when said electrical switching apparatus is moved toward said installed position, said engagement member is structured to engage said switchgear enclosure and move said movable assembly toward said second position, and
wherein, when said movable assembly is disposed in said second position, said engagement member is structured to securely engage said switchgear enclosure, in order to resist undesired movement of said electrical switching apparatus with respect to said switchgear enclosure, and
wherein said movable assembly further comprises at least one biasing element structured to bias said movable assembly toward said second position; and wherein, when said electrical switching apparatus is disposed in said installed position, said at least one biasing element is structured to bias said engagement member toward engagement with said switchgear enclosure, in order that said engagement member maintains engagement with said switchgear enclosure.

13. The securing mechanism of claim 12 wherein said movable assembly comprises at least one side plate; wherein said at least one biasing element is a plurality of springs; and wherein each of said springs has a first end coupled to a corresponding one of said at least one side plate, and a second end coupled to said mount.

14. A draw-out electrical switching apparatus which is movable into and out of an installed position within a switchgear enclosure, said draw-out electrical switching apparatus comprising:
a housing;
separable contacts;
an operating mechanism structured to open and close said separable contacts; and at least one securing mechanism structured to secure said draw-out electrical switching apparatus in said installed position, said at least one securing mechanism comprising:
- a mount structured to be coupled to said draw-out electrical switching apparatus, and
- a movable assembly movably coupled to said mount and including an engagement member, said movable assembly being structured to move among a first position corresponding to said draw-out electrical switching apparatus not being fully installed within said switchgear enclosure, and a second position corresponding to said draw-out electrical switching apparatus being disposed in said installed position,
- wherein, when said draw-out electrical switching apparatus is moved toward said installed position, said engagement member is structured to engage said switchgear enclosure and move said movable assembly toward said second position,
- wherein, when said movable assembly is disposed in said second position, said engagement member is structured to securely engage said switchgear enclosure, in order to resist undesired movement of said draw-out electrical switching apparatus with respect to said switchgear enclosure, and
- wherein, upon movement of said draw-out electrical switching apparatus to said installed position, said engagement member securely engages said switchgear enclosure automatically, without said engagement member or said movable assembly being manipulated by an actuator.

15. The draw-out electrical switching apparatus of claim 14 wherein said switchgear enclosure comprises a back panel and a plurality of walls arranged to form a cell; wherein said draw-out electrical switching apparatus is structured to be disposed in said installed position within said cell; and wherein, when said draw-out electrical switching apparatus is disposed in said installed position within said cell, said engagement member of said movable assembly of said at least one securing mechanism is structured to engage a portion of said back panel and to secure said draw-out electrical switching apparatus with respect to said cell, without requiring a number of tools.

16. A draw-out electrical switching apparatus which is movable into and out of an installed position within a switchgear enclosure, said draw-out electrical switching apparatus comprising:
- a housing;
- separable contacts;
- an operating mechanism structured to open and close said separable contacts; and
- at least one securing mechanism structured to secure said draw-out electrical switching apparatus in said installed position said at least one securing mechanism comprising:
  - a mount structured to be coupled to said draw-out electrical switching apparatus, and
  - a movable assembly movably coupled to said mount and including an engagement member, said movable assembly being structured to move among a first position corresponding to said draw-out electrical switching apparatus not being fully installed within said switchgear enclosure, and a second position corresponding to said draw-out electrical switching apparatus being disposed in said installed position,
  - wherein, when said draw-out electrical switching apparatus is moved toward said installed position said engagement member is structured to engage said switchgear enclosure and move said movable assembly toward said second position,
  - wherein, when said movable assembly is disposed in said second position, said engagement member is structured to securely engage said switchgear enclosure, in order to resist undesired movement of said draw-out electrical switching apparatus with respect to said switchgear enclosure, and
  - wherein said movable assembly of said at least one securing mechanism further comprises at least one biasing element structured to bias said movable assembly toward said second position; and wherein, when said draw-out electrical switching apparatus is disposed in said installed position, said at least one biasing element is structured to bias said engagement member toward engagement with said switchgear enclosure, in order that said engagement member maintains engagement with said switchgear enclosure.

17. A draw-out electrical switching apparatus which is movable into and out of an installed position within a switchgear enclosure, said draw-out electrical switching apparatus comprising:
- a housing;
- separable contacts;
- an operating mechanism structured to open and close said separable contacts; and
- at least one securing mechanism structured to secure said draw-out electrical switching apparatus in said installed position said at least one securing mechanism comprising:
  - a mount structured to be coupled to said draw-out electrical switching apparatus, and
  - a movable assembly movably coupled to said mount and including an engagement member, said movable assembly being structured to move among a first position corresponding to said draw-out electrical switching apparatus not being fully installed within said switchgear enclosure, and a second position corresponding to said draw-out electrical switching apparatus being disposed in said installed position,
  - wherein, when said draw-out electrical switching apparatus is moved toward said installed position, said engagement member is structured to engage said switchgear enclosure and move said movable assembly toward said second position,
  - wherein, when said movable assembly is disposed in said second position, said engagement member is structured to securely engage said switchgear enclosure, in order to resist undesired movement of said draw-out electrical switching apparatus with respect to said switchgear enclosure, and
  - wherein said mount of said at least one securing mechanism comprises a first portion and a second portion; wherein said first portion is structured to be coupled to said draw-out electrical switching apparatus; wherein said second portion comprises a first side member, a second side member disposed opposite and spaced apart from said first side member, and a plurality of first fasteners securing said first side member to said second side member; and wherein said movable assembly is disposed between said first side member and said second side member.

18. The draw-out electrical switching apparatus of claim 17 wherein said movable assembly of said at least one securing mechanism comprises a first side plate, a second side plate disposed opposite and spaced apart from said first side plate, and a plurality of second fasteners securing said first side plate to said second side plate; wherein said engagement member is disposed between, and is movable with respect to, said first side plate and said second side plate; wherein said first side plate is parallel to said first side member and is movable with respect thereto; and wherein said second side plate is parallel to said second side member and is movable with respect thereto.

19. The draw-out electrical switching apparatus of claim 18 wherein said second fasteners of said movable assembly of said at least one securing mechanism include first ends, second ends, and shafts extending between the first ends of said second fasteners and the second ends of said second fasteners; wherein said second fasteners extend through said first side plate and said second side plate; wherein the first ends of said second fasteners are disposed at or about a corresponding one of said first side plate and said second side plate; wherein the second ends of said second fasteners are disposed at the other corresponding one of said first side plate and said second side plate; wherein said shafts of said second fasteners extend between said first side plate and said second side plate; and wherein each of said first side member and said second side member has a profile structured to cooperate with a corresponding one of the first ends of said second fasteners and the second ends of said second fasteners, in order to guide movement of said movable assembly.

20. The draw-out electrical switching apparatus of claim 19 wherein said engagement member of said movable assembly of said at least one securing mechanism comprises an elongated body including a first end structured to be engageable with said switchgear enclosure, a second end disposed opposite and distal from the first end of said elongated body, a first edge, a second edge disposed opposite the first edge of said elongated body, and at least one slot extending through said elongated body; wherein said movable assembly further comprises at least one pin member extending between said first side plate and said second side plate; wherein said at least one pin member is disposed within a corresponding one of said at least one slot; wherein said at least one slot extends from proximate the first edge of said elongated body toward the second edge of said elongated body and toward the second end of said elongated body, in order to form an acute angle with respect to the first edge of said elongated body; wherein said first side plate and said second side plate are movable in a first direction with respect to said first side member and said second side member; wherein said elongated body is movable in both said first direction and in at least one second direction, which is different than said first direction; and wherein said elongated body is movable both with respect to said first side plate and said second side plate, and with respect to said first side member and said second side member.

21. A draw-out electrical switching apparatus which is movable into and out of an installed position within a switchgear enclosure, said draw-out electrical switching apparatus comprising:
a housing;
separable contacts;
an operating mechanism structured to open and close said separable contacts; and
at least one securing mechanism structured to secure said draw-out electrical switching apparatus in said installed position, said at least one securing mechanism comprising:
a mount structured to be coupled to said draw-out electrical switching apparatus, and
a movable assembly movably coupled to said mount and including an engagement member said movable assembly being structured to move among a first position corresponding to said draw-out electrical switching apparatus not being fully installed within said switchgear enclosure and a second position corresponding to said draw-out electrical switching apparatus being disposed in said installed position,
wherein, when said draw-out electrical switching apparatus is moved toward said installed position, said engagement member is structured to engage said switchgear enclosure and move said movable assembly toward said second position,
wherein, when said movable assembly is disposed in said second position, said engagement member is structured to securely engage said switchgear enclosure, in order to resist undesired movement of said draw-out electrical switching apparatus with respect to said switchgear enclosure,
wherein said switchgear enclosure comprises a back panel and a plurality of walls arranged to form a cell; wherein said draw-out electrical switching apparatus is structured to be disposed in said installed position within said cell; and wherein, when said draw-out electrical switching apparatus is disposed in said installed position within said cell said engagement member of said movable assembly of said at least one securing mechanism is structured to engage a portion of said back panel and to secure said draw-out electrical switching apparatus with respect to said cell without requiring a number of tools, and
wherein said draw-out electrical switching apparatus is a draw-out circuit breaker; wherein said back panel of said cell includes a protrusion extending outwardly from said back panel; wherein said engagement member comprises an elongated body including a first end and second end disposed opposite and distal from the first end of said elongated body; and wherein, when said draw-out circuit breaker is disposed in said installed position within said cell, the first end of said elongated body is structured to be disposed beneath said protrusion, in order to resist said draw-out circuit breaker from undesirably pivoting with respect to said cell.

22. The draw-out electrical switching apparatus of claim 21 wherein said elongated body further includes a first edge and a second edge; wherein said protrusion of said back panel of said cell is a ledge including an underside; and
wherein, when said draw-out circuit breaker is disposed in said installed position within said cell, the second edge of said elongated body, at or about the first end of said elongated body, is structured to engage the underside of said ledge.

23. The draw-out electrical switching apparatus of claim 21 wherein said housing of said draw-out circuit breaker includes a first side, a second side, and a draw-out mechanism; wherein said draw-out mechanism comprises a first rail disposed on the first side of said housing, and a second rail disposed on the second side of said housing; and wherein said at least one securing mechanism is a first securing mechanism coupled to said first rail, and a second securing mechanism coupled to said second rail.

* * * * *